United States Patent [19]

Baan et al.

[11] Patent Number: 5,627,647
[45] Date of Patent: May 6, 1997

[54] HIGH SPEED LASER/AIR SLIDE DIMENSIONAL MEASUREMENT TOOL

[75] Inventors: Robert L. Baan, Wallkill; Paul J. Damore, Fishkill, both of N.Y.

[73] Assignee: International Business Machines Corporation, Armonk, N.Y.

[21] Appl. No.: 668,292

[22] Filed: Jun. 21, 1996

[51] Int. Cl.$^6$ .................................................... G01B 11/04
[52] U.S. Cl. ........................ 356/372; 356/383; 356/386; 250/559.24; 250/559.26; 250/223 R
[58] Field of Search ...................... 356/372, 379, 356/380, 383, 384, 385, 386, 387; 280/223 R, 559.24, 559.26, 559.27

[56] References Cited

U.S. PATENT DOCUMENTS

| | | | |
|---|---|---|---|
| 3,986,604 | 10/1976 | Siryj | 250/223 R |
| 4,063,820 | 12/1977 | Borgese | 356/383 |
| 4,773,029 | 9/1988 | Claesson et al. | 356/380 |

OTHER PUBLICATIONS

Mitutoyo Measuring Instruments, Catalog No. 300, 4 pages, undated.
VIEW 1220, *View Engineering Inc.*, 1650 N. Voyager Ave., Simi Valley, CA 93063, 8 pages, 1987.

*Primary Examiner*—F. L. Evans
*Attorney, Agent, or Firm*—DeLio & Peterson, LLC; John J. Tomaszewski; Aziz M. Ahsan

[57] ABSTRACT

A method and apparatus for measuring the x-y-z dimensions of an article such as a ceramic chip carrier are provided. The measuring apparatus and method utilize scanning laser beams to measure the dimensions of the article without physically contacting the article as the article is moved through the measuring device at a controlled speed preferably on a cushion of air. A separate laser beam scanning device is used to measure each dimension of the article and the laser beams are positioned to scan back and forth along the dimension to be measured. As the article moves through the preferred L-shaped apparatus, the direction of the article automatically changes in a transverse direction so that all three dimensions are conveniently and accurately measured.

10 Claims, 2 Drawing Sheets

HIGH SPEED LASER/AIR SLIDE DIMENSIONAL MEASUREMENT TOOL

BACKGROUND OF THE INVENTION

1. Field of the Invention

The present invention relates to a method and apparatus for measuring the height, width and length of articles and, in particular, to measuring electronic components such as ceramic chip carriers (packages) using a non-contact measuring device employing laser beams and an air/slide for moving the article along a defined path which method and apparatus operate at high measuring speeds, measurement accuracy and precision.

2. Description of Related Art

The dimensional measurement of articles is an important method in a number of industrial areas ranging from the automobile industry to the electronics industry. Self-contained off-line and on-line measurement systems are used for industrial quality control and operations applications and, for convenience, the following description will be directed to the electronics industry and in particular, to the measurement of electronic components such as the ceramic chip carriers used for multi-chip modules (MCM's), single chip modules (SCM's), etc. which are employed in a wide variety of electronic devices such as computers, televisions and the like.

In one application, a chip is electrically connected to a substrate such as a card, a board, another chip or any other part to which an electrical connection is required. One particular application concerns ceramic chip carriers which carriers are required to have a high degree of dimensional precision and accuracy. The chip carriers are measured in at least the x and y dimensions and preferably in all three x-y-z dimensions. In general and for consistency herein, the x dimension refers to the width, the y dimension to the length and the z dimension to the height of the article being measured. In addition to the accuracy required in the dimensional measuring process, it is also important that the measurements be performed in a relatively short period of time and that the method and apparatus used be both cost effective and reliable.

The present method for measuring ceramic chip carriers and other such articles uses an optical pattern recognition coordinate measurement device such as the View 1220 made by View Engineering Inc. of Simi Valley, Calif. The View 1220 is a self-contained off-line visual inspection and measurement system intended for industrial quality control applications. The View 1220 installation consists of a Data Gathering Unit (DGU) and a Monitor and Disk Drive Assembly (MDDA).

The DGU is composed of a granite table and arch to which are attached a precision stage, a CCD video camera and associated positioning systems. The DGU contains all the necessary imaging processing electronics and computer hardware. Recirculating ball bearings are used on x and y axes to prevent bounce in vibrating environments. A brochure entitled "*View 1220*" describes the system provides technical information and specifications.

These type devices operate in general by moving a camera to specified measurement locations and then using image processing software and camera position information to make measurements.

These type devices are relatively expensive and slow however, and can cause damage to the carriers or parts being measured due to contact of the carrier and the fixturing devices of the measuring instrument.

Laser scan micrometers are used to dimensionally measure articles such as wire, pressure hose, roller gaps, shafts for out of roundness, tape width and the like. These devices utilize high speed scanning beams which beams are blocked by the part being measured in their path, producing shadowed and non-shadowed sections. Basically, the measured result is displayed as an average value of measurements obtained by repeatedly scanning the object over a specified time interval. These devices can also measure a part in two orthogonal directions with a single measuring unit. Such laser scan micrometers are made by Mitutoyo and different measurement units and technical details are shown in a brochure entitled "*Mitutoyo, Measuring Instruments, Catalog No. 300*".

There still exists a need however, for measuring articles and parts continuously and effectively with a high degree of precision and accuracy and bearing in mind the problems and deficiencies of the prior art, it is therefore an object of the present invention to provide a method for measuring articles, particularly electronic component articles such as ceramic chip carriers, in their x-y dimensions and preferably in their x-y-z dimensions using a high speed and cost effective measuring apparatus.

Another object of the invention is to provide an apparatus or device for measuring ceramic chip carriers and other articles in their x-y dimension and preferably in their x-y-z dimensions.

Other objects and advantages of the present invention will be readily apparent from the following description.

SUMMARY OF THE INVENTION

The above and other objects, which will be apparent to those skilled in the art, are achieved in the present invention which is directed in the first aspect to a method of measuring the x and y and preferably z dimensions of an article such as a ceramic chip carrier, the method comprising:

- advancing the article at a controlled speed along preferably a substantially horizontal substantially planar passageway of a measuring device that comprises first and second and, preferably third measuring members, the first member positioned to measure the x dimension of the article , the second member positioned to measure the y dimension of the article and the third member positioned to measure the z dimension of the article as the article passes the first, second and third measuring members respectively;
- measuring the x or y dimension of the article as it passes its respective measuring member;
- rotating the article in the passageway by 90°;
- continuing advancing the article along the passageway of the measuring device and measuring the x or y dimension of the article not previously measured as the article passes its respective measuring member; and
- transmitting the measured data from the measuring members to computer or other control means for determining the x and y dimensions of the article.

The z dimension of the article can be measured either before or after the article is rotated 90° C.

In another aspect of the invention, a device for measuring the dimensions of an article or part such as a ceramic chip carrier comprises a substantially horizontal substantially planar surface having a passageway which may be straight and which is preferably in the shape of an L having a first passageway and a transverse second passageway. In the L-shaped device, the article being measured moves horizontally along one axis or first passageway of the device until it reaches the end of that first passageway and then moves along the direction of the second passageway or second axis of the device. Using this L-shaped device, the article being measured is not physically rotated 90° during the measurement method but because of the change in direction of the passageway of the measuring device, the article is automatically caused to move in a direction transverse to its original direction. The measuring members are positioned along the passageways. In one embodiment, the measuring members to measure the z and x dimensions of the articles are positioned along the first passageway of the device and the measuring member to measure the y direction is positioned along the second passageway of the measuring device. In the embodiment using laser beams as the measuring member, it is preferred that the laser beam emitting section of the measuring member be positioned above the article being measured for measurement of the x and y dimensions of the article and positioned lateral to the z dimension of the article to measure the height of the article. The measuring members are positioned so that the x and y laser beams scan back and forth across the width of the passageway in preferably a raster scan pattern. The z laser beams scan the article vertically back and forth across the height of the article in a raster pattern. Slits or other openings transverse to the axis of the passageway are provided in the planar horizontal passageways of the measuring device and a vertical slit is provided in the walls of the measuring device, if any, to allow the laser beam to pass from the laser emitter member to the laser receptor member to enable measurement of the amount of laser beam being blocked by the article being measured as it moves along the passageway. The amount of blocked laser beam is an indication of the dimension of the article being measured.

In a further aspect of the invention, the measuring members are preferably laser beams which beams are directed in a plane transverse to the plane of the axis of the article being measured. The beams move back and forth across the plane (across the width of the passageway) in a raster pattern. The laser beam measuring members have a laser beam emitting section and a laser beam receiving section, which depending on the amount of the laser beam blocked by the part as it travels past the measuring member determines the dimension of the article which is being measured.

In another aspect of the invention, the advancing means for the part being measured uses an air/slide (air current) on which the article being measured is elevated on a cushion of air and caused to move in the desired direction at a substantially constant or uniform speed along the passageway to pass the measuring members. An air/slide advancing means minimizes the contact between the article being measured and the measuring device thus minimizing any breakage or abrasion of the article and/or of holding devices needed to secure the article during measurement.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
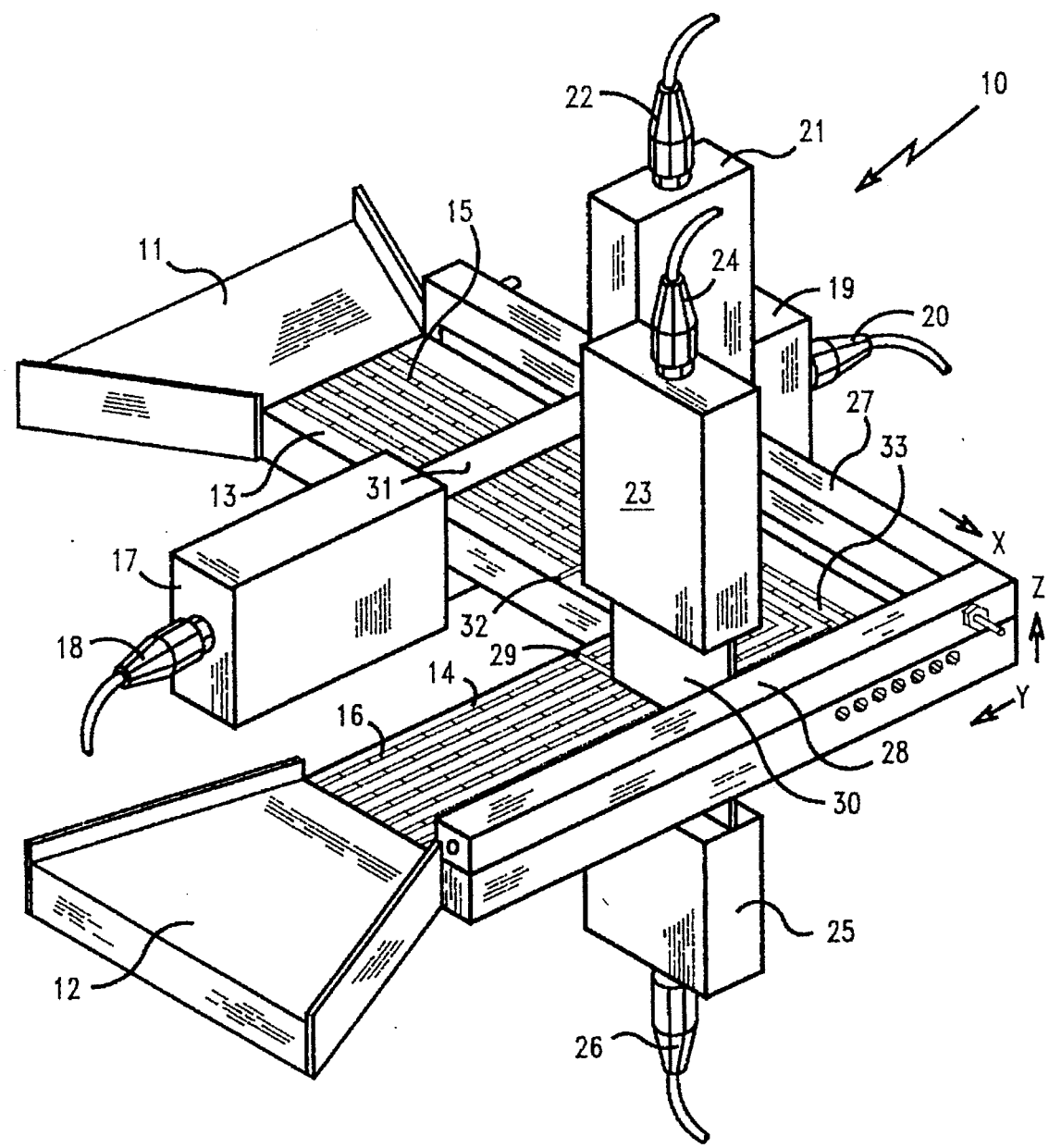
FIG. 1 is a perspective view of a measuring apparatus of the invention.

In describing the preferred embodiment of the present invention, reference will be made herein to FIGS. 1–2 of the drawings in which like numerals refer to like features of the invention. Features of the invention are not necessarily shown to scale in the drawings.

FIG. 1 shows a perspective view of a measuring apparatus 10 of the present invention. The apparatus has an inlet tray 11 and outlet tray 12 onto which an article (not shown) to be measured is introduced and withdrawn, respectively. The measuring apparatus 10 has a first rectangular passageway 13 and a second rectangular passageway 14 along which passageways the article to be measured travels after the article enters at inlet 11. Rectangular passageways 13 and 14 intersect at right angles forming an L shape measuring apparatus shown having equal passageway lengths. Each passageway is shown having substantially the same width, which width is preferably slightly wider than the larger of the x and y dimensions of the part to be measured. The intersection of passageways 13 and 14 forms an intersection area 33 which is, depending on the relative widths of each passageway, square or rectangular in shape.

To move or advance the article to be measured along the passageways 13 and 14, air is supplied to the apparatus 10 through a plurality of air inlets 15 and 16. The air inlets 15 and 16 are positioned along and across the passageway(s) providing a cushion of air which elevates the article and moves the article along the passageway depending on the direction and/or volume of the air flow through the openings. The air is caused to flow upward into the passageways and when an article is placed in the passageway, the article will be elevated on a cushion of air. The air introduced in air inlets 15 and 16 will also be caused to flow in a direction which moves the article along the passageway in the desired direction as shown by the arrows. The air transport system may comprise two way compound angle directional jets known in the art. Other modes to move or advance the article include conveying means, etc. In a device using a conveyor, the conveyor would extend along the first passageway up to the edge of passageway intersection 33 which conveyor would move the article into the passageway intersection 33. A conveyor belt extending from passageway intersection 33 along passageway 16 would move the article to outlet 12.

Laser emitter 17 and laser activator line 18 supply a laser beam 31 which is parallel to the plane of the passageway and transverse to the axis of the passageway and is used to measure the height or z dimension of the article as the article passes through the beam. The z laser receptor 19 and z laser data transmitter 20 receive and transmit the beam received from z laser emitter 17 to a control unit (not shown) after the beam 31 travels up and down across first passageway 13. Similarly, x laser emitter 21 and x laser activator 22 emit a laser beam not shown, which beam travels downward, preferably transverse, toward first passageway 13 back and forth across the passageway and would intersect the article to be measured as it passes under and through the beam. X laser slit 32 is shown and extends across passageway 13 and this slot is positioned to accept the x laser beam and would transmit the unblocked portion of the x laser beam to x laser receptor (not shown) for measurement of the x dimension of the article.

Y laser emitter 23 and y laser activator 24 are shown providing a laser beam 30 which travels downward, preferably transverse, toward second passageway 14 and back and forth across the passageway. The beam 30 is shown passing through y laser slit 29 and being received by y laser receptor 25 and the data representing the unblocked portion of the beam 30 (and hence the Y dimension of the article) are transmitted through y laser data transmitter 26 to a control unit (not shown). The laser beams for each of the measuring means overscans the dimension of the article being measured.

The measuring apparatus 10 is shown having side walls 27 and 28 positioned along the outer periphery of the apparatus. These side wall are used to control the travel of the article to be measured along the passageways and sidewall 28 acts as a stop when the first passageway has been fully traversed by the article. The article at this point is then in passageway intersection area 33 and can no longer travel in the first passageway direction. The article would then be caused to travel along second passageway 14 past y laser beam 30. The article is controlled in its travel along passageway 14 by wall 28.

Figure 2:
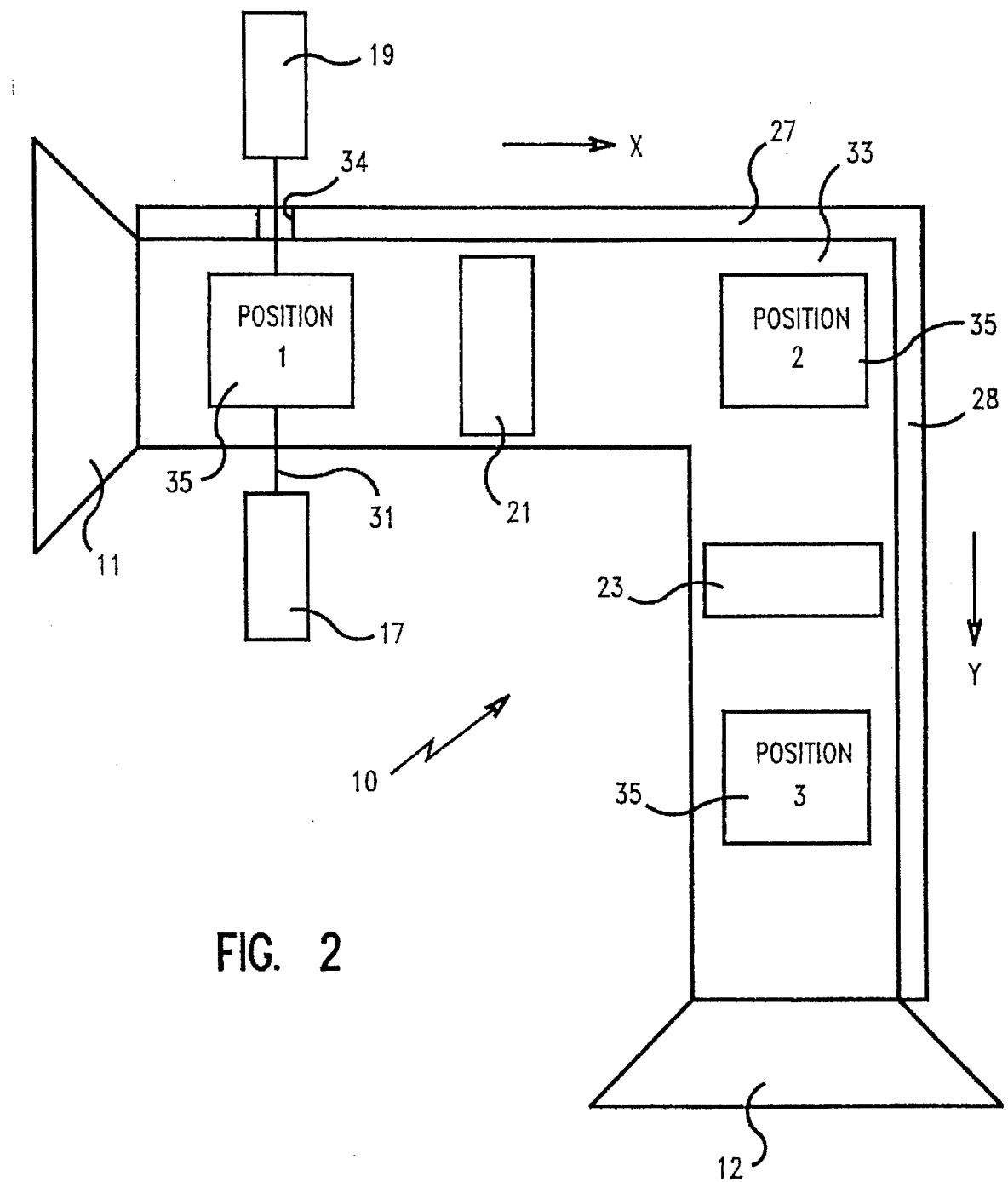
FIG. 2 is a schematic top view of the apparatus of FIG. 1 showing measurement of an article.

Referring to FIG. 2, in operation, the article 35 to be measured would be introduced to the measuring apparatus 10 at inlet 11 and moved along first passageway 13 in the x direction at a controlled speed by air passing upward through air inlets 15 (not shown for clarity). As the article moves along first passageway 13 toward second passageway 14 the article 35 at position 1 first passes the z laser emitter 17 and then would pass x laser emitter 21 thereby passing z laser beam 31 and the x laser beam not shown. When the article 35 meets side wall 28, the article is in position 2 and the article can no longer travel in the first passageway direction. The air flow from air inlets 16 in the second passageway (not shown) cause the article to move along second passageway 14 in the y direction toward outlet 12. As the article moves along the second passageway 14, the article passes y laser emitter 23 and y laser beam 30 (not shown) which measures the y dimension of the article. The measured laser beam is received by y laser receptor 25 and the data transmitted through line 26.

As discussed above, the article is measured by determining the amount of the laser beam which is blocked by the article as the article passes through the respective laser beams. While any laser beam and any laser beam scanning speed can be employed depending on the accuracy of measurement desired, for measurement of a 33mm. square ceramic chip carrier, it is preferred that 60 scanning measurements be made at 0.5 mm intervals. Basically, the laser beam travels across the surface of the article from a first edge to an opposite second edge and then travels back over the article from the second edge to the first edge. This back and forth laser scan is repeated as the article moves through the laser beam. The laser scan micrometer shown in the Mitutoyo brochure, supra, can suitably be employed and three separate micrometer devices are preferably used to provide the x, y and z ceramic chip carrier dimensions. Typically, the measuring member, e.g., micrometer, will have a measuring range of up to 30 mm or more. The scanning rate may also vary with a typical rate of about 350/sec using a visible semiconductor laser wavelength: 670 nm). The laser beam spot size may also vary and is typically 0.1 mm scanning beam thickness. The above specifications and other specifications are given in the Mitutoyo brochure, supra. The speed of travel of the article to be measured will vary and be coordinated with the speed of the laser beam scan to provide the number of measurements per article desired.

A control device (not shown) will be supplied input data from the measuring devices and calculate the article dimensions. The control device can also control the process variables such as article speed, air flow, etc.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of measuring the x, y and z dimensions of an article, the method comprising:

advancing the article at a controlled speed along a substantially horizontal substantially planar passageway of a measuring device that comprises first, second and third measuring members, the first member positioned to measure the x dimension of the article, the second member positioned to measure the y dimension of the article and the third member positioned to measure the z dimension of the article as the article passes the first, second and third measuring members respectively;

measuring the x or y dimension of the article as the article passes its respective measuring member;

rotating the article 90 degrees;

continuing advancing the article along the passageway of the measuring device and measuring the x or y dimension of the article not previously measured as the article passes its respective measuring member;

measuring the z dimension of the article before or after the article is rotated 90 degrees;

transmitting the measured data from the measuring members to computer or other control means for determining the x, y and z dimensions of the article.

2. The method of claim 1 wherein the x and y measuring members are laser emitters and laser receptors which emit and receive laser beams which beams scan back and forth across the width of the passageway, and which beams pass through an opening in the passageway to the laser receptor to enable measurement of the amount of the laser beam being blocked by the article as it moves along the passageway.

3. The method of claim 2 wherein the z measuring member is a laser emitter and laser receptor which emits and receives beams which beams scan the article vertically back and forth across the height of the article and which beams pass to the laser receptor to enable measurement of the amount of the laser beam blocked by the article as it moves along the passageway.

4. The method of claim 3 wherein the article is advanced in the passageway by air currents generated by passing air through openings in the passageway.

5. The method of claim 4 wherein the measuring device is in the shape of an L having a first passageway and a transverse second passageway and wherein either the x or y measuring member is positioned in the first passageway and the other x or y member is positioned in the second passageway.

6. A device for measuring the x, y and z dimensions of an article comprising:

a substantially horizontal substantially planar passageway;

advancing means for moving the article along the passageway;

a measuring member positioned along the passageway for measuring the x dimension;

a measuring member positioned along the passageway for measuring the y dimension;

a measuring member positioned along the passageway for measuring the z dimension;

means for rotating the article 90 degrees after either the x or y measurement but before both measurements are taken;

wherein as the article moves along the passageway the x, y and z measurements are taken as the article moves past the respective measuring means.

7. The device of claim 6 wherein the measuring members are laser beam emitters and laser beam receptors which emitted beams scan back and forth across the width of the passageway to measure the x and y dimensions of the article and vertically up and down across the height of the article to measure the z dimension of the article, the emitted beams being received by the laser beam receptors to determine the amount of the laser blocked by the article.

8. The device of claim 7 wherein the passageway has transverse slits through which the x and y measuring beams pass and are received by the respective laser beam receptor to enable measurement of the amount of the laser beam blocked by the article as the article moves along the passageway.

9. The device of claim 8 wherein the advancing means is a current of air supplied through openings in the passageways.

10. The device of claim 9 wherein the device is in the shape of an L having a first passageway and a transverse second passageway and wherein either the x or y measuring member is positioned in the first passageway and the other measuring member is positioned in the second passageway and when the article reaches the second passageway the article is caused to move along the second passageway in a direction transverse to the direction of the article in the first passageway.

* * * * *